(12) United States Patent
Messier et al.

(10) Patent No.: US 6,996,385 B2
(45) Date of Patent: Feb. 7, 2006

(54) CHANNEL CODE DECODING FOR THE CDMA FORWARD LINK

(75) Inventors: Geoffrey G. Messier, Calgary (CA); Witold A. Krzymien, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 440 days.

(21) Appl. No.: 10/260,226

(22) Filed: Sep. 27, 2002

(65) Prior Publication Data

US 2003/0081658 A1 May 1, 2003

Related U.S. Application Data

(60) Provisional application No. 60/325,183, filed on Sep. 28, 2001.

(51) Int. Cl.
*H04B 17/00* (2006.01)

(52) U.S. Cl. ............................ 455/226.3; 455/67.11; 370/320

(58) Field of Classification Search ............ 455/226.1, 455/226.2, 226.3, 226.4, 446, 447, 448, 452.2, 455/454, 522, 63.1, 67.11, 67.13, 550.1, 561
See application file for complete search history.

(56) References Cited

U.S. PATENT DOCUMENTS

| 6,088,335 A | * | 7/2000 | I et al. | 370/252 |
| 6,157,619 A | * | 12/2000 | Ozluturk et al. | 370/252 |
| 6,212,174 B1 | * | 4/2001 | Lomp et al. | 370/335 |
| 6,278,701 B1 | * | 8/2001 | Ayyagari et al. | 370/335 |
| 6,731,622 B1 | * | 5/2004 | Frank et al. | 370/342 |

OTHER PUBLICATIONS

Proakis, J.G., *Digital Communications*, McGraw Hill, 4th edition, 2001. p. 58.
TIA/EIA, *IS-95-B: TIA/EIA Interim Standard: Mobile Station Base Station Compatibility Standard for Dual-Mode Wideband Spread Spectrum Cellular System*, Telecommunications Industry Association, 1999. p. 7-5.
TIA/EIA, *IS-2000-2: TIA/EIA Physical layer standard for CDMA2000 spread spectrum systems*, Telecommunications Industry Association, 1999. pp. 3-76-3-88.
3rd Generation Partnership Project, "Technical specification group radio access network: Multiplexing and channel coding (FDD) (release 1999), " Mar. 2000, V3.2.0. pp. 16-22.
Rahnema, M. and Y. Antia, "Optimum soft decision decoding with channel state information in the presence of fading." *IEEE Communications Magazine*, vol. 35, No. 7, pp. 110-111, Jul. 1997.
Vucetic, B. and J. Yuan, *Turbo Codes: Principles and Applications*, Kluwer, 2000. p. 145.

(Continued)

*Primary Examiner*—Nguyen T. Vo
*Assistant Examiner*—Thuan T Nguyen
(74) *Attorney, Agent, or Firm*—Christensen O'Connor Johnson Kindness PLLC

(57) ABSTRACT

Channel coding is used on the forward link of a CDMA cellular telephone network to allow the CDMA mobile channel decoder to perform error correction. On a wireless link, channel code performance is improved by providing the channel decoder with an estimate of the reliability of each received symbol. This reliability information is typically the ratio of desired signal energy to interference plus noise variance at the channel decoder input. This invention improves CDMA mobile channel decoder performance using a new technique for calculating more accurate estimates of the signal to interference plus noise ratio at the input of the mobile channel decoder.

15 Claims, 4 Drawing Sheets

OTHER PUBLICATIONS

Mohr, W. and M. Kottkamp, "Downlink performance of IS-95 DS-CDMA under multipath propagation conditions." *IEEE Fourth International Symposium on Spread Spectrum Techniques and Applications,* Sep. 1996, vol. 3, pp. 1063-1067.

Hueda, M.R., C. Rodriguez, and C. Marques, "New interpath interference model for DS-CDMA indoor transmissions with distributed antennas," *11th IEEE Symposium on Personal, Indoor and Mobile Radio Communications (PIMRC 2000),* Sep. 2000, vol. 1, pp. 92-97.

Kim, H., J. Koo, Y.Han, and C. Kang, "Foward link capacity based on interference characteristics in CDMA systems," *52nd IEEE VTS Fall Vehicular Technology Conference (VTC 2000 Fall),* Sep. 2000, vol. 2, pp. 592-596.

Thompson, J.S., P.M. Grant, and B. Mulgrew. "Downlink transmit diversity schemes for CDMA networks," *IEEE VTS 50th Vehicular Technology Conference,* Fall, Sep. 1999, vol. 3, pp. 1382-1386.

Alamouti, S.M. "A simple transmit diversity technique for wireless communications," *IEEE Journal on Selected Areas in Communication,* vol. 16, No. 8, pp. 1451-1458, Oct. 1998.

Hueda, M.R., Corral-Briones, G. and C. Rodriguez, "MMSEC-RAKE receivers with resolution reduction of the diversity branches: analysis, simulation, and application," *IEEE Transactions on Communications,* Jun. 2001, vol. 49, pp. 1073-1081.

* cited by examiner

CHANNEL CODE DECODING FOR THE CDMA FORWARD LINK

CROSS-REFERENCE TO RELATED APPLICATION

This application claims the benefit of the filing date of U.S. Provisional Application No. 60/325,183, filed Sep. 28, 2001.

BACKGROUND OF THE INVENTION

This invention relates to the forward link of a CDMA cellular telephone network as shown in FIG. 1. Blocks 101, 102 and 103 are data sources representing the information transmitted to each mobile communicating with the base station. Blocks 104, 105 and 106 are the channel coders that add structured redundancy to the information streams. This coding is used for error correction in the mobile. Channel interleaving is added in blocks 107, 108 and 109 to shuffle the order of the encoded symbols. This improves channel code performance in the presence of burst errors. The signals are then each spread with unique spreading codes generated in blocks 110, 111 and 112, added together and spread with a common spreading code generated in block 113. Orthogonal Walsh codes are commonly used in blocks 110, 111 and 112 and a PN sequence-based code is commonly used in block 113.

For conventional base station operation, block 114 performs the modulation and analog signal processing necessary to transmit the forward channel signal using a single antenna. If transmit diversity is being used, block 114 performs the processing necessary to transmit the forward channel signal using two or more antennas.

The composite forward channel signal travels through the radio channel in block 115. The mobile receiver in block 116 extracts the signal through a despreading process and optionally performs some processing on the different multipath replicas of the received signal. This processing can be used to increase the energy of the desired signal or to cancel interference from the other signals transmitted by the base station. Block 117 de-interleaves the samples of the received signal. The channel decoder in block 118 uses the channel coding added to the information stream to perform error correction and produce an estimate of the transmitted information.

On the CDMA forward link, the amplitude of the desired signal and the level of the interference corrupting that signal will change with time. This makes some channel encoded symbols at the mobile receiver output more reliable than others. Convolutional and turbo codes are typically used for error correction on the CDMA forward link [2, 3, 4]. The channel decoder algorithms for these codes are all improved if they are provided with reliability estimates for each received symbol [5, 6].

This reliability information is typically an estimate of the received energy of an encoded symbol divided by an estimate of the variance of the interference plus noise corrupting that symbol. This signal to interference plus noise ratio (SNIR) for received symbol i is denoted $\gamma_i$ and must be calculated at the input to channel decoder block 118. This is equivalent to calculating $\gamma_i$ at the output of receiver block 116 since the de-interleaver block 117 does not alter $\gamma_i$.

SUMMARY OF THE INVENTION

This patent improves error correction performance using a new technique for calculating more accurate estimates of $\gamma_i$ at the output of receiver block 116. The accuracy of the estimates is improved by separately calculating the variance of the in-cell interference and out-of-cell interference plus thermal noise processes at the output of receiver block 116. For this purpose, the receiver chain of FIG. 1 is modified to include a SNIR estimator, where the SNIR estimator separately estimates the variance of the in-cell interference and the out-of-cell interference plus noise. In addition, this patent provides a technique for determining the variance of in-cell interference and out-of-cell interference plus thermal noise at the input to receiver block 116. This information is required by the SNIR estimator block.

U.S. Pat. No. 5,903,554 also estimates SNIR by separately considering in-cell and out-of-cell interference. However, this patent uses its SNIR estimates for generating forward link power control commands rather than improving channel decoding. As well, U.S. Pat. No. 5,903,554 calculates the level of in-cell interference by multiplying the level of the pilot signal by a coefficient. This coefficient is either calculated by the mobile or transmitted from the base station. The technique presented in this disclosure determines in-cell interference variance based on interference levels at the receiver input, radio channel conditions, the spreading codes used on the CDMA forward link and the multipath combining performed by the mobile receiver.

BRIEF DESCRIPTION OF THE DRAWINGS

There will now be described preferred embodiments of the invention, with respect to the drawings, by way of illustration only, in which.

DESCRIPTION OF PREFERRED EMBODIMENTS

The signal to interference plus noise ratio at the output of receiver block 116 during encoded symbol interval i can be written as $\gamma_i = E_i/\sigma^2(i)$ where $E_i$ is the energy of the received encoded symbol and $\sigma^2(i)$ is the variance of the interference and noise corrupting that symbol. An estimate of $E_i$ is calculated using conventional techniques described below. This invention improves the accuracy of $\gamma_i$ through a new technique for calculating $\sigma^2(i)$ that separately accounts for the in-cell interference and out-of-cell interference plus thermal noise levels on the CDMA forward link.

The desired signal received by a CDMA mobile is corrupted by three processes: in-cell interference, out-of-cell interference and thermal noise. In-cell interference is corruption from the other signals transmitted by the base station or base stations communicating with the mobile. In soft or softer handoff, all the base stations participating in the handoff produce in-cell interference. Out-of-cell interference is corruption from the signals transmitted by the base stations that are not communicating with the mobile and is typically lumped together with thermal channel noise. During symbol interval i, the in-cell interference at the output of receiver block 116 is denoted $I_i$ and the out-of-cell interference plus thermal noise component at the output of receiver block 116 is denoted $N_i$.

Figure 1:
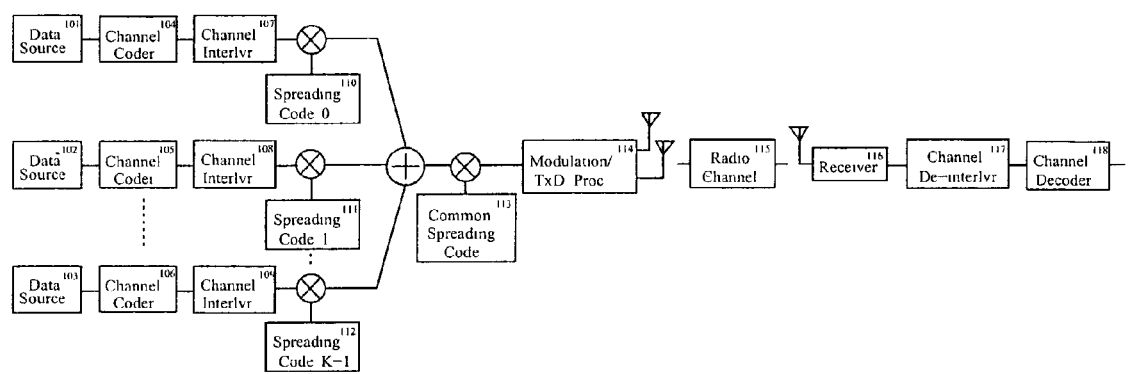
FIG. 1 is a schematic showing a prior art CDMA forward link.
Figure 2:
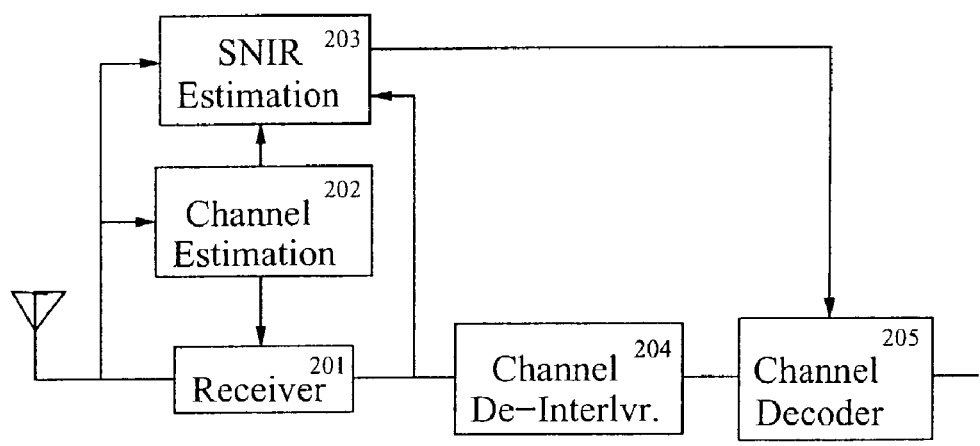
FIG. 2 is a schematic showing elements of a mobile receive chain according to an embodiment of the invention.

FIG. 2 shows a block diagram of a CDMA mobile receive chain that incorporates an embodiment of this invention. Block 201 is the receiver block that extracts the channel encoded data stream transmitted by the base station and may for example be a Rake receiver. Any of various receivers may be used to perform multipath processing on the received signal. This invention is described specifically in relation to a Rake receiver, but is not limited to a Rake receiver for all embodiments. Block 204 de-interleaves the received encoded symbols and block 205 performs error correction using the forward link channel code. Using techniques well known in the art, the channel estimation block 202 determines the complex impulse response of the forward link radio channel using the pilot signal transmitted by the base station.

According to an embodiment of this invention there is proposed the addition of block 203 for calculating estimates of $\gamma_i$ based on the signal at the input to receiver block 201, the signal at the output of receiver block 201 and the channel impulse response information calculated by block 202. Block 203 calculates $\gamma_i$ according to $$\gamma_i = \frac{E_i}{\langle I_i^2 \rangle + \langle N_i^2 \rangle} \tag{1}$$

where $\langle I_i^2 \rangle$ and $\langle N_i^2 \rangle$ denote the variance of the in-cell interference and out-of-cell interference plus thermal noise processes at the output of receiver block 201. The following describes the procedure used by block 203 to calculate $E_i$, $\langle I_i^2 \rangle$ and $\langle N_i^2 \rangle$ for single antenna base station transmission and transmit diversity.

Single Antenna Base Station Transmission

Let $X_i(n)$ be the spread spectrum waveform used by a CDMA base station to transmit the ith channel encoded symbol $x_i$ to user 0 in a sector with K users. The waveform is expressed in discrete time at two samples per spreading code chip as $X_i(n)=G_i x_i a_0(n-2iR)$ where R is the number of spreading code chips per encoded data symbol, $G_i$ is the forward link power control gain factor applied to $x_i$ and $a_k(n)$ is the complex spreading code waveform assigned to user k. In the following, the encoded data symbols are assumed to be real valued such that $x_i \in \{-1,1\}$. However, this technique can be extended to complex valued symbols in a straightforward manner. The spreading code, $a_k(n)$, is commonly the product of a real valued Walsh code unique for each user, generated in blocks 110, 111 or 112, and a complex valued PN spreading sequence that is common for all users in the sector, generated in block 113.

The complex valued samples of the forward channel impulse response are written as $c(n,l) l=0, \ldots L-1$, where l signifies excess delay in half chip intervals. This response represents the multipath reflections between the mobile and all the base stations communicating with the mobile. The number of impulse response samples with significant signal energy at time n is equal to L.

The channel estimation block 202 determines the discrete time complex impulse response of the forward radio channel for each symbol interval i. It is assumed that the channel remains constant for the symbol interval such that the estimate of c(2iR, l) produced by block 202 remains valid for the entire symbol duration. In the following, the term c(l) will be used to refer to c(2iR, l), where the index 2iR is removed for brevity.

Figure 3:
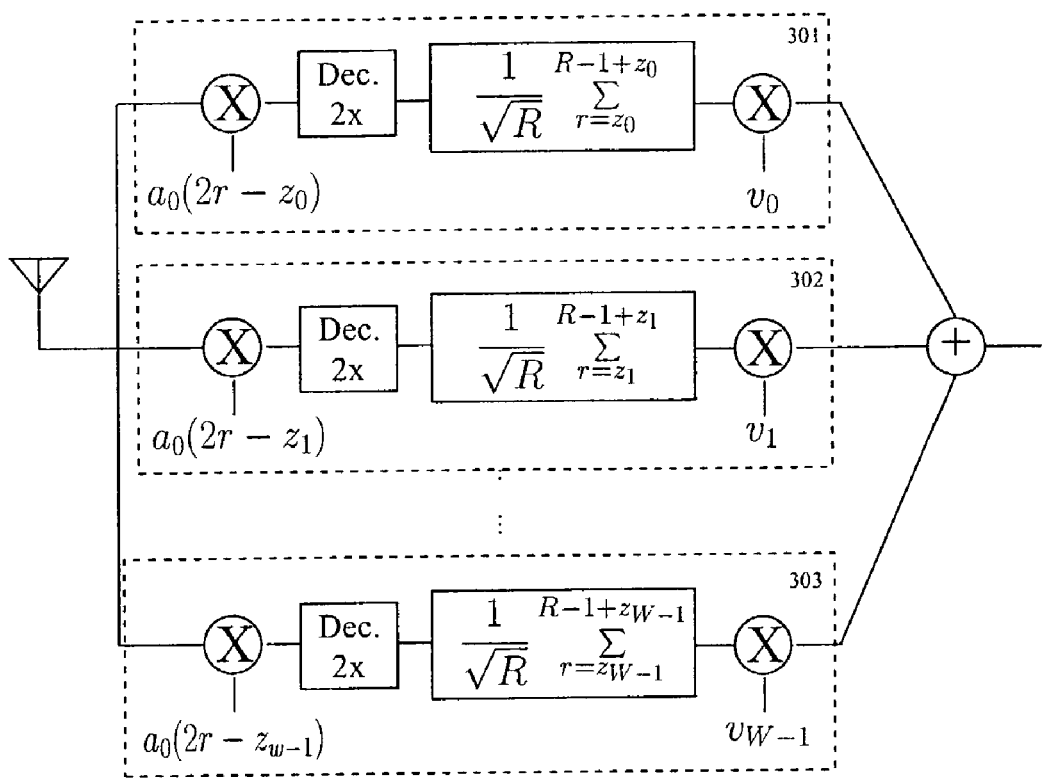
FIG. 3 is a schematic showing a receiver for use in the embodiment of the invention shown in FIG. 2.

FIG. 3 illustrates a detailed example of the receiver structure in block 201 that can be used for single antenna base station transmission. Blocks 301, 302 and 303 are three of the W parallel branches for processing the different multipath replicas of the forward channel signal. The signal components tracked by the receiver branches are located at channel delays $z_0, z_1, \ldots z_{W-1}$, where $0 \leq z_w \leq L-1$. Each branch extracts the desired signal using a despreading operation. After despreading, the branch outputs are aligned in time, multiplied by combining weights and added together. The combining weights are denoted $v_0, v_1, \ldots v_{W-1}$.

Block 203 estimates $E_i$ at the output of the mobile receiver using techniques well know in the art. These techniques include averaging the energy of the signal at the output of receiver block 201.

Out-of-cell interference and thermal noise is typically modeled as a single Gaussian process at the receiver input [7, 8, 9]. Accounting for the multipath combining and despreading performed within the receiver, the out-of-cell interference plus thermal noise affecting symbol $x_i$ at the receiver output is $$N_i = \sum_{w=0}^{W-1} v_w \cdot \frac{1}{\sqrt{R}} \sum_{r=0}^{R-1} a_0(2r) N(2iR + z_w + 2r) \tag{2}$$

$$= \sum_{w=0}^{W-1} v_w N_{w,i}$$

where N(n) denotes the out-of-cell interference plus thermal noise process at the input to the receiver in discrete time at two samples per chip resolution. Two samples per chip is two times oversampling of the received signal. Therefore, N(n) is a coloured complex Gaussian process with zero mean and variance $\sigma_{NN}^2$ that becomes white when decimated to one sample per chip.

The despreading stage in each receiver branch does not alter the Gaussian distribution of the out-of-cell interference. Samples of a Gaussian process that are multiplied by a pseudorandom spreading code with real and imaginary components equal to 1 or −1 retain a Gaussian distribution. The Gaussian process at the output of the normalized despreading summation block in FIG. 3 has the same variance as the Gaussian process at the input to the summation [1]. Therefore, $N_{w,i}$ in (2) is a complex white Gaussian process with zero mean and variance $\sigma_N^2$. Due to the independence of $N_{w,i}$, $w=0, \ldots W-1$, the SNIR estimation algorithm implemented in block 203 calculates the variance of $N_i$ according to $$\langle N_i^2 \rangle = \sigma_N^2 \sum_{w=0}^{W-1} |v_w|^2. \tag{3}$$

where the technique for determining $\sigma_N^2$ is also implemented in block 203 and is discussed below.

After undergoing path-loss and shadowing effects, the composite forward link signal transmitted by the base station is represented in discrete time at two samples per chip as I(n). Assuming a large number of users, this signal is modeled as a coloured complex Gaussian process with zero mean and variance $\sigma_I^2$ that becomes white when decimated to one sample per chip. Since I(n) propagates through the forward link radio channel, the in-cell interference at the output of finger w can be written as $$I_{w,i} = v_w \frac{1}{\sqrt{R}} \sum_{r=0}^{R-1} a_0(2r) \cdot \sum_{l=0}^{L-1} c(l) I(2iR + z_w - l + 2r) \quad (4)$$

Receiver branch w will extract the desired signal from the component of I(n) arriving at delay $z_w$. Assuming orthogonal Walsh codes are used for forward link spreading, the despreading performed by receiver branch w will completely cancel the signals of the K−1 interfering users that also arrive at delay $z_w$. Therefore, $$I_{w,i} = v_w \sum_{\substack{l=0 \\ l \neq z_w}}^{L-1} c(l) I'_{z_w - l, i} \quad (5)$$

where the term $I'_{r,i}$ is the normalized sum of R samples of the Gaussian process I(n) multiplied by the spreading code of user 0 with an offset of r during symbol interval i. As was the case for out-of-cell interference, the despreading operation in (4) does not alter the Gaussian distribution of I(n). Therefore, $I'_{r,i}$ is a complex white Gaussian random process with zero mean and variance $\sigma_I^2$.

Let the vector $I_i = [I_{0,i}, \ldots I_{W-1,i}]^H$ represent the in-cell interference at the finger outputs during symbol interval i. The covariance matrix $R = E\{I_i I_i^H\}$ represents the second order statistics of the interference where the elements of the matrix are $$\varphi_{mn} = \sigma_I^2 \sum_{l=0}^{L-1} \sum_{q=0}^{L-1} v_m c(l) \quad (6)$$

$$(v_n c(q))^* \cdot \delta((q-l) - (n-m)) \cdot [1 - \delta(m-l)][1 - \delta(n-q)]$$

where the technique for determining $\sigma_I^2$ is also implemented in block 203 and is discussed below.

The total in-cell interference at the mobile receiver output is $$I_i = \sum_{w=0}^{W-1} I_{w,i}.$$

Using (6), the variance of $I_i$ is calculated in block 203 according to $$\langle I_i^2 \rangle = \sum_{m=0}^{W-1} \sum_{n=0}^{W-1} \varphi_{mn}. \quad (7)$$

Time Delay Transmit Diversity (TDTD)

When using TDTD, the base station transmits the same CDMA signal from two antennas with the second antenna delayed by $L_d$ channel delay samples, where $L_d \geq L$ [10]. This artificially increases the number of multipath reflections which can improve the diversity achieved when the mobile receiver processes the different multipath components of the forward channel signal. The mobile receiver chain in FIG. 2 and the technique for calculating $\gamma_i$ used for single antenna base station transmission can be applied without change to the signal received from a base station using TDTD.

Phase Sweep Transmit Diversity (PSTD)

When using PSTD, the base station transmits the same signal from two antennas using slightly offset carrier frequencies. The signals combine in the radio channel to produce artificially fast fading, improving interleaver performance for low velocity mobiles [10]. The mobile receiver chain in FIG. 2 and the technique for calculating $\gamma_i$ used for single antenna base station transmission can be applied without change to the signal received from a base station using PSTD.

Space Time Transmit Diversity (STTD)

Space Time Transmit Diversity (STTD) is a technique first proposed by Alamouti [11] that has been adapted for use in CDMA systems. The encoded data symbols are transmitted in such a way that the fingers of a mobile Rake receiver are able to perform maximal ratio combining on the signals received from the base station antennas.

For user 0, the discrete time signals transmitted by the base station at two samples per chip are $$X_i^0(n) = G_i x_i a_0(n - 2iR) \quad (8)$$

$$X_i^1(n) = \begin{cases} G_i x_{i+1}^* a_0(n - 2iR), & i \text{ even} \\ -G_i x_{i-1}^* a_0(n - 2iR), & i \text{ odd} \end{cases}$$

where $X_i^\alpha(n)$ is the signal transmitted from antenna a during symbol interval i.

The CDMA mobile receive chain for single antenna base station transmission in FIG. 2 is also used by mobiles receiving an STTD signal. However, receiver block 201 requires modification that is shown in detail in FIG. 4. Blocks 401, 402 and 403 are three of the W parallel branches used by the receiver for processing the different multipath components of the signal received from the base station. The contents of block 401 are shown in detail to illustrate the processing performed on one multipath component of the received base station signal. It is assumed that the channel remains stationary over two encoded symbol intervals. The term $c_\alpha(n,l)$ refers to the complex channel response between base station antenna $\alpha$ and the mobile. In the following, the term $c_\alpha(2iR,l)$ is replaced with $c_\alpha(l)$ for brevity.

The receiver processing described by Alamouti must be performed using the signal received over two consecutive symbol intervals [11]. Therefore, the output of the despreading stage during even symbol intervals is buffered by a unit delay element so that the Alamouti processing can be performed during the odd symbol intervals. The multiplexing block places the information symbol output by the upper branch in front of the information symbol from the lower branch.

Block 203 estimates $E_i$ at the output of the mobile receiver using techniques well know in the art. These techniques include averaging the energy of the signal at the output of receiver block 201.

As for the single antenna case, the out-of-cell interference plus thermal noise at the mobile receiver input is denoted $N(n)$ and the interference at the output of the despreading stage is denoted $N_{w,i}$. Accounting for STTD combining, the out-of-cell interference at the Rake receiver output during symbol interval $i$ is $$N_i = \begin{cases} \sum_{w=0}^{W-1} [c_0^*(z_w)N_{w,i} - c_1(z_w)N_{w,i+1}^*], & i \text{ even} \\ \sum_{w=0}^{W-1} [c_0^*(z_w)N_{w,i} + c_1(z_w)N_{w,i-1}^*], & i \text{ odd} \end{cases} \quad (9)$$

Due to the independence of $N_{w,i}$, $w=0, \ldots W-1$, the SNIR estimation algorithm in block 203 estimates the variance of $N_i$ according to $$\langle N_i^2 \rangle = \sigma_N^2 \sum_{w=0}^{W-1} [|c_0(z_w)|^2 + |c_1(z_w)|^2]. \quad (10)$$

where the technique for determining $\sigma_N^2$ is also implemented in block 203 and is discussed below.

After undergoing path-loss and shadowing effects, the composite forward link signal transmitted by base station antenna $a$ is represented in discrete time at two samples per chip as $I^\alpha(n)$. Assuming a large number of users, the signals transmitted by different antennas are independent and are modeled as coloured complex Gaussian processes with zero mean and variance $\sigma_I^2$ that become white when decimated to one sample per chip.

Receiver branch $w$ will extract the desired signal from the component of $I^\alpha(n)$ arriving at delay $z_w$. Assuming orthogonal Walsh codes are used for forward link spreading, the despreading performed by finger $w$ will completely cancel the signals of the $K-1$ interfering users that also arrive at delay $z_w$. Therefore, the in-cell interference at the finger output is $$I_{w,i} = \begin{cases} \sum_{\substack{l=0 \\ l \neq z_w}}^{L-1} \{c_0^*(z_w)[c_0(l)I_{z_w-l,i}^0 + c_1(l)I_{z_w-l,i}^1] - \\ c_1(z_w)[c_0(l)I_{z_w-l,i+1}^0 + c_1(l)I_{z_w-l,i+1}^1]^*\}, i \text{ even} \\ \sum_{\substack{l=0 \\ l \neq z_w}}^{L-1} \{c_0^*(z_w)[c_0(l)I_{z_w-l,i}^0 + c_1(l)I_{z_w-l,i}^1] + \\ c_1(z_w)[c_0(l)I_{z_w-l,i-1}^0 + c_1(l)I_{z_w-l,i-1}^1]^*\}, i \text{ odd} \end{cases} \quad (11)$$

where $I_{r,i}^\alpha$ is the normalized sum of $R$ samples of $I^\alpha(n)$ multiplied by $\alpha_0(n)$ with an offset of $r$ during symbol interval $i$. The overall in-cell interference at the mobile receiver output is given by $$I_i = \sum_{w=0}^{W-1} I_{w,i}.$$

Figure 4:
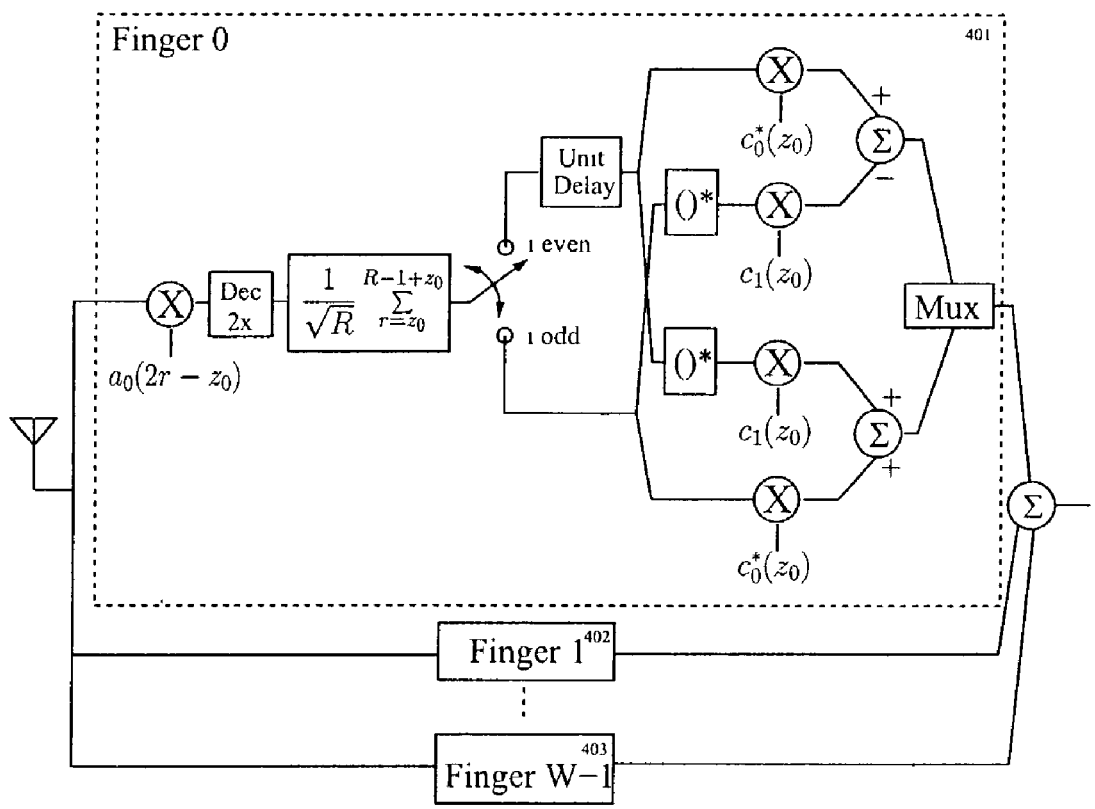
FIG. 4 is a schematic showing a second receiver for use in the embodiment of the invention shown in FIG. 2.

If $I_i=[I_{0,i}, \ldots I_{W-1,i}]^T$ represents the in-cell interference at the receiver branch outputs in FIG. 4 during symbol interval $i$, then the elements of the covariance matrix $R=E\{I_i I_i^H\}$ are equal to $$\varphi_{mn} = \sigma_I^2 \sum_{l=0}^{L-1} \sum_{q=0}^{L-1} [c_0^*(z_m)c_0(l)c_0(z_n)c_0^*(q) + \\ c_0^*(z_m)c_1(l)c_0(z_n)c_1^*(q) + c_1(z_m)c_0^*(l)c_1^*(z_n)c_0(q) + \\ c_1(z_m)c_1^*(l)c_1^*(z_n)c_1(q)] \cdot \delta((q-l) - (n-m))[1 - \\ \delta(m-l)][1 - \delta(n-q)]. \quad (12)$$

where the technique for determining $\sigma_I^2$ is also implemented in block 203 and is discussed below.

Using these covariance matrix elements, the variance of $I_i$ is calculated by block 203 according to $$\langle I_i^2 \rangle = \sum_{m=0}^{W-1} \sum_{n=0}^{W-1} \varphi_{mn} \quad (13)$$

Estimation of Input Interference Levels

This disclosure shows that the quantities $\sigma_I^2$ and $\sigma_N^2$ are required to determine in-cell interference and out-of-cell interference plus thermal noise levels at the output of mobile receiver block 201. These quantities must be estimated from the signal at the input to block 201. The term $\sigma_I^2$ is the variance of the forward channel signal received from all the base stations communicating with the mobile after path loss and shadowing but before small scale multipath channel effects. Alternatively, the quantity $\sigma_I^2$ can be interpreted as the power of the signal received by the mobile from the base stations it communicates with after small scale channel effects are averaged out. The quantity $\sigma_N^2$ is the variance of the out-of-cell interference plus thermal noise process at the input to mobile receiver block 201.

The algorithm in block 203 determines $\sigma_I^2$ and $\sigma_N^2$ using the second order statistics of the signal at the input to receiver block 201. The discrete time signal at the input to block 201 is denoted at one sample per chip as $y(k)=c_d(k,q)\star I_d(k)+N_d(k)$, where $\star$ indicates convolution. The terms $I_d(k)$ and $N_d(k)$ are $I(n)$ and $N(n)$ decimated to one sample per chip, respectively. The term $c_d(k,q)$ is $c(n,l)$ decimated to one sample per chip in both time and excess delay.

The autocorrelation function of $y(k)$, $r_\upsilon = \langle y(k)y^*(k-\upsilon) \rangle$ will be a function of $c_d(k,q)$, $\sigma_I^2$, and $\sigma_N^2$ for $\sigma=0$. However, since $N_d(k)$ is white, $r_\upsilon$ will be a function only of $c_d(k,q)$ and $\sigma_I^2$ for $\upsilon \neq 0$. This observation can be used to determine $\sigma_I^2$ and $\sigma_N^2$ from samples of the interference and noise waveform, $y(k)$, at the mobile receiver input.

Since $c_d(k,q)$ is determined by block 202, the channel terms can be treated as constants rather than random processes when calculating $r_\upsilon$. The autocorrelation function of $y(k)$ can therefore be written as $$r_\upsilon = \begin{cases} \sum_{i=0}^{L-1} \sum_{m=0}^{L-1} c_d(k,i)c_d^*(k-\upsilon,m)\langle I_d(k-i)I_d^*(k-m-\upsilon) \rangle + \\ \langle N_d(k)N_d^*(k-\upsilon) \rangle, \upsilon \leq L \\ 0, \text{ otherwise} \end{cases} \quad (14)$$

Since the spreading code chip rate is typically much higher than the maximum Doppler frequency of the channel, $c_d(k,q) \approx c_d(k-\upsilon,q) = c_d(q)$ for $\upsilon \leq L$, where the notation $c_d(q)$ is used for brevity. The expression in (14) can be simplified to $$r_\upsilon = \sigma_I^2 \sum_{i=0}^{L-1}\sum_{m=0}^{L-1} c_d(i)c_d^*(m)\delta((i-m)-\upsilon) + \sigma_N^2 \delta(\upsilon) \quad (15)$$

where $\delta(z)$ equals 1 for $z=0$ and 0 otherwise.

It is noted that (15) is a linear function of the variances being estimated. The autocorrelation values for $0 \leq \upsilon \leq L-1$ can be written as a series of linear equations such that $$r = H\Theta \quad (16)$$

where $r=[r_0, \ldots r_{L-1}]^T$, $\Theta = [\sigma_N^2 \sigma_I^2]^T$ and $$H = \begin{bmatrix} 1 & \sum_{i=0}^{L-1}\sum_{m=0}^{L-1} c_d(i)c_d^*(m)\delta(i-m) \\ 0 & \sum_{i=0}^{L-1}\sum_{m=0}^{L-1} c_d(i)c_d^*(m)\delta((i-m)-1) \\ \vdots & \vdots \\ 0 & \sum_{i=0}^{L-1}\sum_{m=0}^{L-1} c_d(i)c_d^*(m)\delta((i-m)-(L-1)) \end{bmatrix} \quad (17)$$

The elements of r can be determined from the received signal using a time average, where $$r_\upsilon \simeq \frac{1}{N_s} \sum_{m=0}^{N_s-1} y(m)y^*(m-\upsilon) \quad (18)$$

Since (16) is a linear equation defining the unknown parameters, the Least-Squares Estimator (LSE) can be used such that $$[\sigma_N^2 \sigma_I^2]^T = (H^T H)^{-1} H r. \quad (19)$$

The time interval required to collect the $N_s$ samples used in (18) is equal to $T_s = N_s/R_s$, where $R_s$ is sampling rate. The calculation in (18) must be performed while the channel is stationary, such that $T_s \leq T_c$, where $T_c$ is the coherence time of the channel. If $T_s > T_c$, due to a large $N_s$, then the $T_s$ second interval is divided into several consecutive smaller intervals, each shorter than $T_c$. Estimates of $\sigma_I^2$ and $\sigma_N^2$ are calculated during each of these shorter intervals and then averaged together. Since the estimator is linear, the accuracy of this average is equivalent to the accuracy of the single estimate possible if the channel remained stationary for the full $T_s$.

REFERENCES (all of which are hereby incorporated by reference herein where permissible by law)

[1] J. G. Proakis, *Digital Communications*, McGraw Hill, 4 edition, 2001.
[2] TIA/EIA, *IS-95-B: TIA/EIA Interim Standard: Mobile Station Base Station Compatibility Standard for Dual-Mode Wideband Spread Spectrum Cellular System*, Telecommunications Industry Association, 1995.
[3] TIA/EIA, *IS-2000-2: TIA/EIA Physical layer standard for CDMA2000 spread spectrum systems*, Telecommunications Industry Association, 1999.
[4] 3rd Generation Partnership Project, "Technical specification group radio access network: Multiplexing and channel coding (FDD) (release 1999)," 2000–03, V3.2.0.
[5] M. Rahnema and Y. Antia, "Optimum soft decision decoding with channel state information in the presence of fading," *IEEE Communications Magazine*, vol. 35, no. 7, pp. 110–111, July 1997.
[6] B. Vucetic and J. Yuan, *Turbo Codes: Principles and Applications*, Kluwer, 2000.
[7] W. Mohr and M. Kottkamp, "Downlink performance of IS-95 DS-CDMA under multipath propagation conditions," in *IEEE Fourth International Symposium on Spread Spectrum Techniques and Applications*, September 1996, vol. 3, pp. 1063–1067.
[8] M. R. Hueda, C. Rodriguez, and C. Marques, "New interpath interference model for DSCDMA indoor transmissions with distributed antennas," in *11th IEEE International Symposium on Personal, Indoor and Mobile Radio Communications (PIMRC 2000)*, September 2000, vol. 1, pp. 92–97.
[9] H. Kim, J. Koo, Y. Han, and C. Kang, "Forward link capacity based on interference characteristics in CDMA systems," in *52nd IEEE VTS Fall Vehicular Technology Conference (VTC 2000 Fall)*, September 2000, vol. 2, pp. 592–596.
[10] J. S. Thompson, P. M. Grant, and B. Mulgrew, "Downlink transmit diversity schemes for CDMA networks," in *IEEE VTS 50th Vehicular Technology Conference, Fall*, September 1999, vol. 3, pp. 1382–1386.
[11] S. M. Alamouti, "A simple transmit diversity technique for wireless communications," *IEEE Journal on Selected Areas in Communication*, vol. 16, no. 8, pp. 1451–1458, October 1998.

While examples of the principles of operation of the invention have been described, immaterial modifications may be made to the invention as described and these are intended to be covered by the claims.

We claim:

1. A method of communication, the method comprising the steps of:
    receiving a CDMA signal transmitted over a channel to a mobile receiver operating in a cell of a CDMA cellular communications system;
    estimating the energy of the received CDMA signal;
    estimating the forward channel impulse response of the channel;
    using the forward channel impulse response of the channel, estimating the variance of interference and noise affecting the CDMA signal, by separately finding the variance of in-cell channel interference and the variance of out-of-cell interference and noise; and
    decoding, at a channel decoder, the CDMA signal using the estimated energy of the received CDMA signal and the variance of the interference and noise affecting the CDMA signal.

2. The method of claim 1 in which the mobile receiver receives a CDMA signal incorporating multipath components and the mobile receiver processes the multipath components to produce an output.

3. The method of claim 2 in which the energy of the received CDMA signal is estimated at the output of the mobile receiver, the variance of the in-cell interference at the output of the mobile receiver is estimated using the variance of the in-cell interference at the input to the mobile receiver and multipath processing performed by the mobile receiver, and the variance of the out-of-cell interference and noise at the output of the mobile receiver is estimated using the variance of the out-of-cell interference and noise at the mobile receiver input and multipath processing performed by the mobile receiver.

4. The method of claim 3 in which estimates of the variances of the in-cell interference and out-of-cell interference plus thermal noise processes at the input to the mobile receiver are found from an auto-correlation of the received CDMA signal and the estimate of the forward channel impulse response.

5. The method of claim 1 in which the variance of the in-cell interference at the mobile receiver output is calculated by accounting for the processing performed by the mobile receiver on multipath components of the received signal and the partial interference cancellation provided by orthogonal spreading codes used in the CDMA cellular communications system.

6. The method of claim 1 in which the variance of out-of-cell interference plus thermal noise at the mobile receiver output is calculated by accounting for the processing performed by the mobile receiver on multipath components of the received signal.

7. Apparatus for decoding signals transmitted on a forward link channel of a CDMA cellular communications system, the apparatus comprising:
 a CDMA receiver having an input and an output;
 a channel de-interleaver connected to the output of the CDMA receiver and having a de-interleaver output;
 a channel estimator connected to receive signals appearing at the input to the CDMA receiver and being configured to provide an estimate of the channel impulse response of the forward link channel to the CDMA receiver;
 a SNIR estimator connected to receive signals including encoded symbols appearing at the input to the CDMA receiver and connected to the channel estimator for receiving an estimate of the channel impulse response, the SNIR estimator having as output an estimate of the signal to interference plus noise ratio of a signal received over the forward link channel by the CDMA receiver, wherein the SNIR estimator is configured to find an estimate of the signal to interference plus noise ratio by separately finding the variance of in-cell channel interference and the variance of out-of-cell interference and noise; and
 a channel decoder connected to the de-interleaver output and to the SNIR estimator for receiving an estimate of the signal to noise interference ratio of each received encoded symbol.

8. The apparatus of claim 7 in which the mobile receiver receives a CDMA signal incorporating multipath components and the mobile receiver processes the multipath components to produce an output.

9. The apparatus of claim 8 in which the SNIR estimator is configured to estimate the variance of the in-cell interference at the output of the mobile receiver using the variance of the in-cell interference at the input to the mobile receiver and multipath processing performed by the mobile, and the variance of the out-of-cell interference and noise at the output of the mobile receiver using the variance of the out-of-cell interference and noise at the mobile receiver input and multipath processing performed by the mobile receiver.

10. The apparatus of claim 7 in which the SNIR estimator is configured to find an estimate of the variances of the in-cell interference and out-of-cell interference plus thermal noise processes at the input to the mobile receiver from an auto-correlation of the received CDMA signal and the estimate of the forward channel impulse response.

11. A method of estimating the signal to noise plus interference ratio of a CDMA signal transmitted over a channel of a CDMA communications network and received at a receiver, the method comprising the steps of:
 a) estimating the energy of the received CDMA signal;
 b) estimating the channel impulse response of the channel;
 c) finding an estimate of the variance of the in-cell interference and out-of-cell interference plus thermal noise processes at the mobile receiver output using an auto-correlation of the received CDMA signal and an estimate of the channel impulse response; and
 d) calculating the signal to noise interference ratio as the quotient of (1) the estimated energy of the received signal divided by (2) the sum of the variances found in step c).

12. The method of claim 11 in which finding an estimate of the variance of the in-cell interference and out-of-cell interference plus thermal noise processes at the mobile receiver output takes into account multipath processing of the received signal and the orthogonality of spreading codes used in the CDMA communications network.

13. The method of claim 12 in which the signal to noise interference ratio found in step d) is used in further processing of the received signal.

14. The method of claim 13 in which the further processing of the received signal comprises decoding the received signal.

15. The method of claim 13 in which the further processing of the received signal comprises generating forward link power commands.

* * * * *